United States Patent
Krenz et al.

(10) Patent No.: US 9,362,736 B2
(45) Date of Patent: Jun. 7, 2016

(54) METHOD FOR IMPROVING POWER DISTRIBUTION PROTECTION

(75) Inventors: Michael Krenz, Roscoe, IL (US); Carl A. Wagner, Beloit, WI (US); Jeffrey T. Wavering, Rockford, IL (US); Norbert J. Simper, Bissingen (DE); Josef Maier, Munningen (DE); Rainer J. Seidel, Tussenhausen (DE); Michael William Foster, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1078 days.

(21) Appl. No.: 13/456,898

(22) Filed: Apr. 26, 2012

(65) Prior Publication Data
US 2013/0286524 A1  Oct. 31, 2013

(51) Int. Cl.
| | |
|---|---|
| *H02H 3/00* | (2006.01) |
| *H02H 7/00* | (2006.01) |
| *H02H 3/30* | (2006.01) |
| *H02H 7/26* | (2006.01) |
| *H02H 3/08* | (2006.01) |
| *H02H 9/02* | (2006.01) |
| *H02H 7/30* | (2006.01) |

(52) U.S. Cl.
CPC .............. *H02H 3/305* (2013.01); *H02H 7/261* (2013.01); *H02H 7/262* (2013.01); *H02H 7/263* (2013.01); *H02H 7/30* (2013.01)

(58) Field of Classification Search
CPC ............ H02H 3/08; H02H 3/087; H02H 9/02
USPC ........................................................ 361/62
See application file for complete search history.

(56) References Cited

U.S. PATENT DOCUMENTS 4,631,622 A  *  12/1986  Howell .................... H02H 7/22
                                                            361/44

FOREIGN PATENT DOCUMENTS

GB           1355827           6/1974

OTHER PUBLICATIONS

Extended European Search Report for application EP13165366.9, mailed Sep. 24, 2013, 7 pages.

* cited by examiner

*Primary Examiner* — Dharti Patel
(74) *Attorney, Agent, or Firm* — Cantor Colburn LLP

(57) ABSTRACT

A solid state switch module is provided for use in a power distribution network including an input differential protection connection for receiving a measured current value from an upstream module. The solid state switch module also includes an output differential protection connection for sending a measured current value. The solid state switch module includes a trip outlet for sending a trip signal to an upstream solid state switch, and a trip inlet for receiving a trip signal from a downstream solid state switch. The trip inlet is operably coupled to the switch. A current sensor measures the current value of a connected power transmission line across the solid state switch module. A summer adds a current input from a parallel module with the current measures by the current sensor. A comparator determines whether an amount of current lost between the solid state switch module and an upstream module is acceptable.

17 Claims, 4 Drawing Sheets

METHOD FOR IMPROVING POWER DISTRIBUTION PROTECTION

BACKGROUND OF THE INVENTION

This invention generally relates to power distribution systems and, more particularly, to a power distribution system in a vehicle such as an aircraft.

Vehicles, such as aircrafts, typically utilize one or more power distribution networks to distribute power from a primary power source (e.g., a generator) to various vehicle devices, such as the landing gear, lighting and door locks for example. The power distribution networks may be configured to have a primary distribution network that distributes power from one or more generators to one or more electrical busses. A secondary power distribution network distributes the power from the electrical busses to the loads.

Power distribution networks often carry very high currents between various switches in the network. Transmission lines between these switches may be protected using circuit breakers or differential current sensing. To apply differential current sensing to conventional power distribution systems, additional hardware and processing equipment is required to measure and compare currents at multiple locations along a transmission line. Inclusion of this additional hardware, such as mechanical contactors, wound magnetic core transformers, and Hall Effect transducers, for example, increases the cost and complexity of the power distribution network.

BRIEF DESCRIPTION OF THE INVENTION

According to one embodiment of the invention, a solid state switch module is provided for use in a power distribution network including an input differential protection connection for receiving a measured current value from an upstream module. The solid state switch module also includes an output differential protection connection for sending a measured current value. The solid state switch module includes a trip outlet for sending a trip signal to an upstream solid state switch, and a trip inlet for receiving a trip signal from a downstream solid state switch. The trip inlet is operably coupled to the switch. A current sensor measures a current value of the power transmission line across the solid state switch module. A summer adds a current input from a parallel module with the current measured by the current sensor. A comparator determines whether an amount of current lost between the solid state switch module and an upstream module is acceptable.

According to an alternate embodiment of the invention, a system for providing differential protection in a power distribution network is provided including a first solid state switch module including a comparator connected to a power transmission line at a first location. The first solid state switch module determines a first current in the power transmission line at the first location. The system further includes a second solid state switch module connected to the power transmission line at a second location. The second solid state switch module determines a second current of the power transmission line at a second location. Circuitry couples the second solid state switch with the first solid state switch to transfer the second current to the first solid state switch module. The comparator determines a difference between the second current and the first current. The first solid state switch module transmits a trip signal to the second solid state switch module in response to the difference being greater than a selected threshold. The trip signal causes the second solid state switch module to open.

According to yet another embodiment of the invention, a method for identifying a loss in power within a power distribution network includes measuring a current of a power transmission line at an output of an upstream solid state switch. The current of the power transmission line is then measured at the input of a downstream solid state switch. The current at the input of the downstream solid state switch is then compared with the current at the output of the upstream solid state switch to determine the difference. The difference is then compared to a selected threshold. If the difference is outside of the selected threshold, a trip signal is sent from the downstream solid state switch to the upstream solid state switch.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
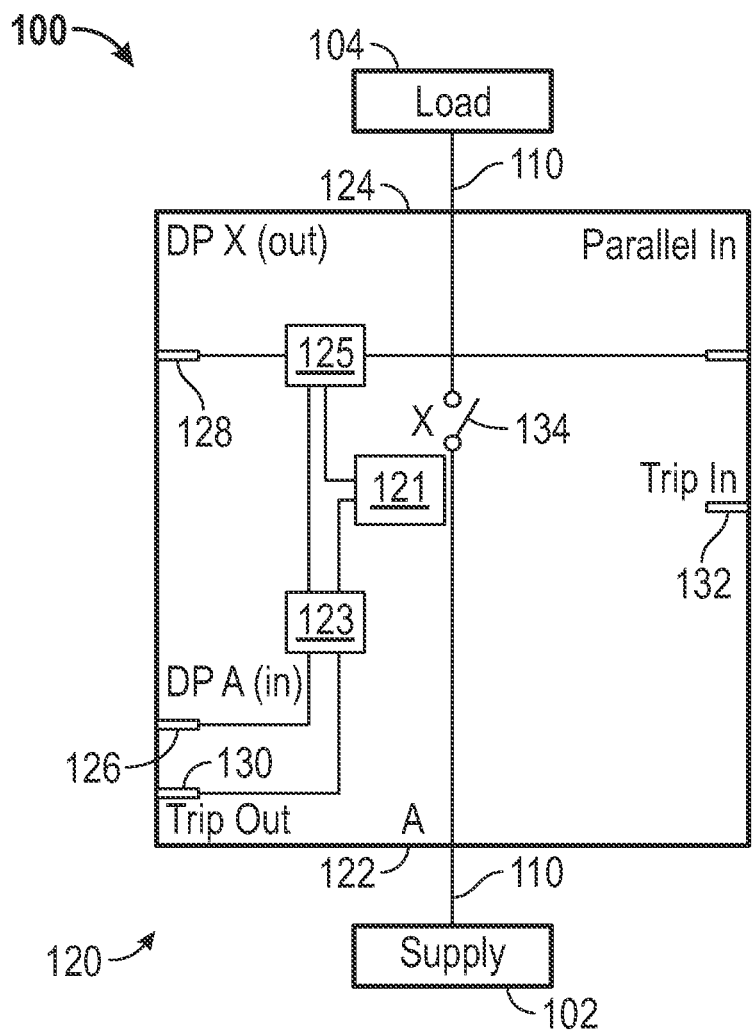
FIG. 1 is a schematic diagram of a solid state switch according to an embodiment of the invention for use in a power distribution network.

Referring now to FIG. 1, an exemplary modular solid state switch 120 for use in a power distribution network is shown according to an embodiment of the invention. A power transmission line 110, extending from a power source 102 to a load 104, is connected to the switch 120. In one embodiment, the switch 120 is a modular solid state switch. The switch 120 includes an input differential protection (DP) connection 126 at a first end 122 and an output DP connection 128 at a second, opposing end 124 of the solid state switch 120. The input DP connection 126 receives a current (scaled or un-scaled) value from an external source such as, for example, an upstream switch module as described below with reference to FIG. 2. The output DP connection 128 provides an output current value (scaled or unscaled).

In one embodiment, the solid state switch 120 includes a current sensor 121 that measures the current of the power transmission line 110 as it passes through the solid state switch 120. Exemplary current sensors include differential voltage shunts, miniaturized Hall Effect sensors and giant magneto responsive (GMR) type sensors. The measured current is provided to both the output DP connection 128 and the input DP connection 126 for various purposes described herein. In one embodiment, the measured current is provided to a summer 125 before being provided to the output DP connection 128 as is explained further below. In one embodiment, the solid state switch 120 includes a comparator 123 connected to the input DP connection 126 and the current sensor 121. The comparator 123 evaluates the difference between the current measured by current sensor 121 and a measured current value of an upstream module received by input DP connection 126. In one embodiment, the summer 125 includes the functionality of the comparator 123, and a separate comparator is unnecessary.

Each modular solid state switch 120 additionally includes a trip outlet 130 from which a trip signal may be sent to at least one upstream module, and a trip inlet 132 in which a trip signal may be received from a downstream module. The trip outlet 130 is activated, in one embodiment, when the difference between the current measured by current sensor 121 and the current received at the input DP connection 126 exceeds a particular threshold level. In another embodiment, the difference is based on the sum produced in the summer 125 and the current received at the input DP connection 126. The level may be predefined and adjusted depending on the context. In one embodiment, the trip outlet 130 is located adjacent the input DP connection 126. The trip outlet 130 is coupled to the comparator 123. The trip input 132 of the solid state switch 120 is operably coupled to a switch 134 for opening and closing the switch 134 to affect the flow of power along the power transmission line 110.

Figure 2:
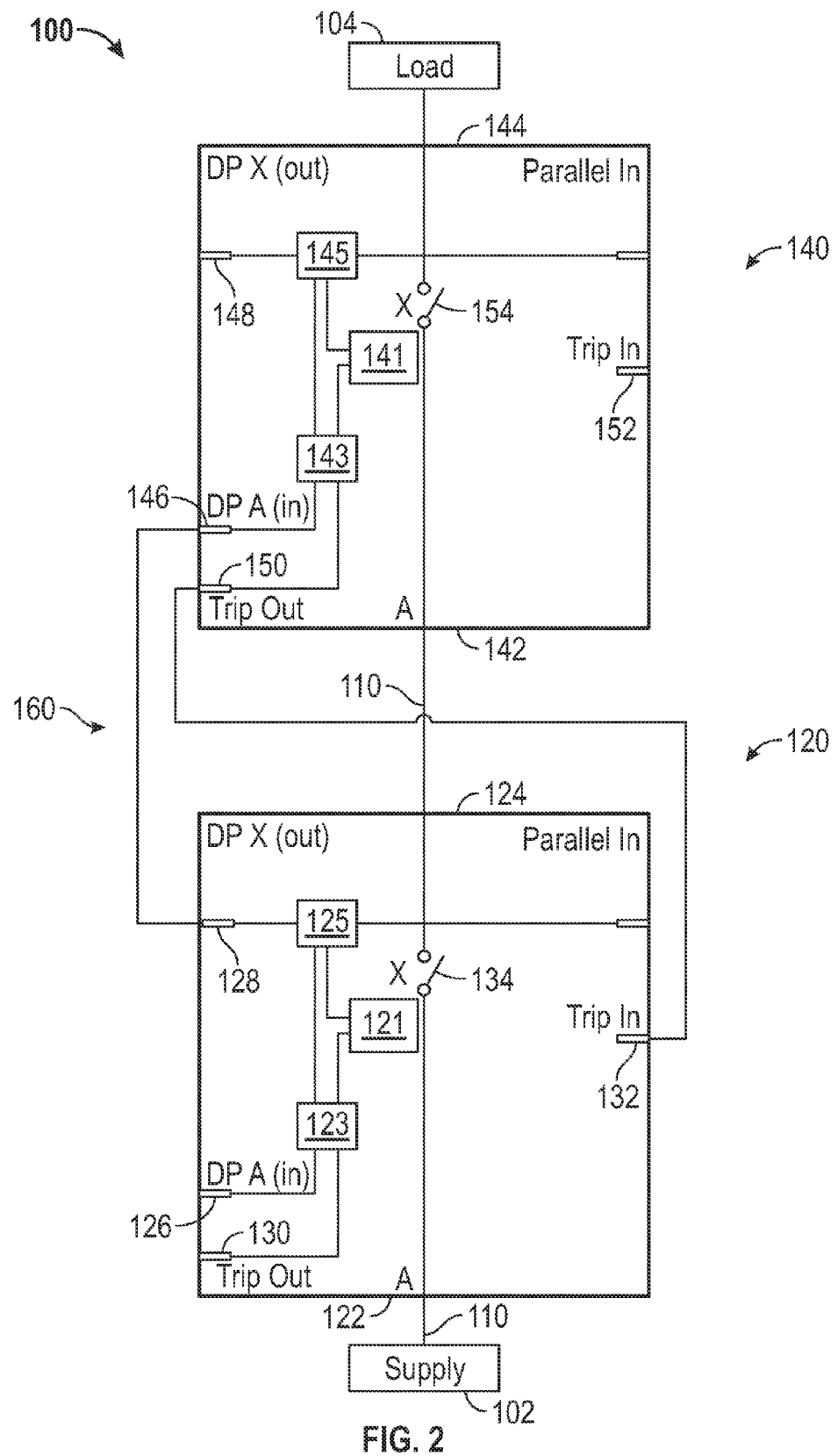
FIG. 2 is a schematic diagram of a portion of a power distribution network according to an embodiment of the invention.

FIG. 2 illustrates an exemplary portion of a power distribution network 100, such as in an aircraft, for example. A power transmission line 110, extending from a power source 102 to a load 104, is connected to multiple solid state switch modules 120, 140 in series. The first solid state switch module 120 is positioned upstream from a second solid state switch module 140 along the power transmission line 110. Similar to the first solid state switch module 120, the second solid state switch module 140 includes a second input DP connection 146 adjacent a first end 142, a second output DP connection 148 proximal to a second end 144, a second trip outlet 150, and a second trip inlet 152 coupled to a second switch 154. In one embodiment, the second solid state switch module 140 additionally includes a current sensor 141 for measuring the current of the power transmission line 110 through the second module 140, a comparator 143 for comparing input and output values at respective DP connections 146, 148 against a measured current value of an upstream module, and a summer 145 for adding the current measured by the current sensor 141 to a current measured in another (parallel) module. In one embodiment, the first and second solid state switches 120 and 140 are identical, and therefore, are interchangeable within the power distribution network 100.

The first output DP connection 128 is connected to the second input DP connection 146 by connection circuitry 160. The circuitry 160 additionally couples the second trip outlet 150 to the first trip inlet 132. The second input DP connection 146 receives a current value from the first output DP connection 128 of the first solid state switch 120. In the illustrated embodiment, the current value is the current measured by current sensor 121. In another embodiment, the current value could be the sum of the current measured by current sensor 121 and other current sensors (not shown). The comparator 143 within the second solid state switch module 140 compares the current measured by current sensor 141 with the measured current value received by the second input DP connection 146. Such a measurement can be used to determine the loss in current along the power transmission line 110 between the second solid state switch 140 and the first solid state switch 120. That is, the comparison can be used to determine if a fault exists in the transmission line 110 between the first 120 and second 140 switches. If the difference is greater than a selected or calculated allowable limit or threshold, the comparator 143, coupled to the second trip outlet 150, places a trip signal on the second trip outlet 150. The trip signal is conveyed to the first trip inlet 132, via the circuitry 160 coupling the first and second solid state switches 120, 140, causing the first switch 134 of the upstream first solid state switch 120 to open. The allowable threshold of the loss in current between adjacent tiers of solid state switches will vary with each application. In one embodiment, the allowable threshold is a difference in current of less than or equal to 8 percent.

Figure 3:
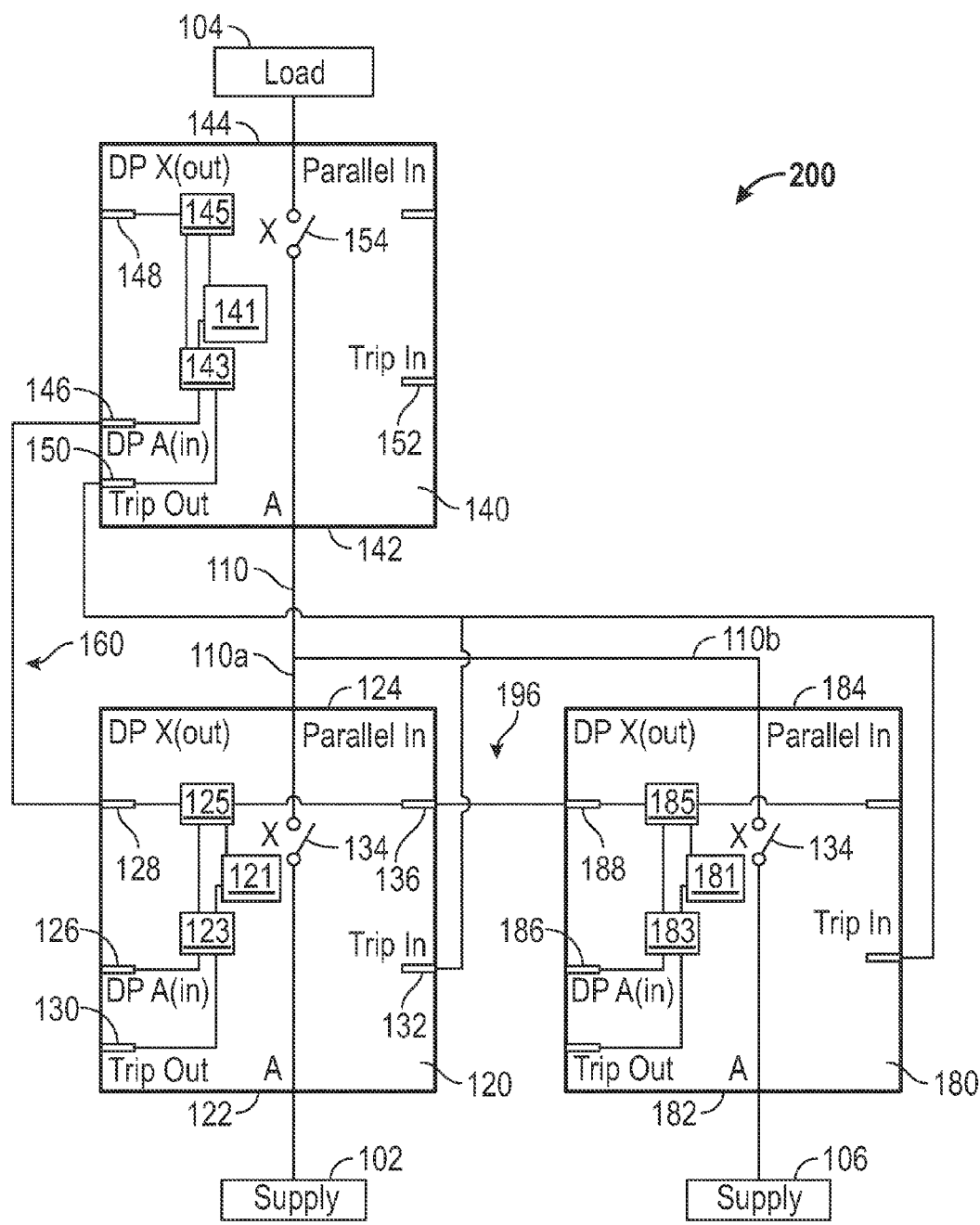
FIG. 3 is a schematic diagram of a portion of a power distribution network according to another embodiment of the invention.

Referring now to FIG. 3, an exemplary portion of an alternate power distribution network 200 is shown. In the network 200, the first solid state switch module 120 and a third solid state switch module 180 are parallel source switches coupled to the second modular solid state switch 140, which acts as a single destination switch. In one embodiment, the plurality of solid state switches within the network are identical and, therefore, the illustrated solid state switches 120, 140, 180 are interchangeable within the network 200. In the exemplary embodiment, the first solid state switch 120 is connected to a first branch 110a of power transmission line 110, and the third solid state switch 180 is connected to a second branch 110b of power transmission line 110. At a position located between the source switches 120, 180 and the destination switch 140, the first branch 110a and the second branch 110b unite to form a single power transmission line 110. It shall be understood the power transmission provided in this example could be used for either alternating or direct current systems. In the event that the power is AC power, it is assumed that supplies 104 and 106 are in phase.

Similar to the other solid state switches modules within the network, the third solid state switch 180 has a third input DP connection 186 near a first end 182 and a third output DP connection 188 near a second, opposite end 184 of the third switch 180. The third solid state switch 180 additionally includes a current sensor 181, a comparator 183, and a summer 185 arranged in a manner similar to the first and second solid state switches 120, 140. In the illustrated embodiment, the output DP connection 188 of the third solid state switch 180 is connected to a parallel input 136 of the first solid state switch 120 by wiring 196.

In the power distribution network illustrated in FIG. 3, the first and third solid state switches 120, 180 are parallel sources jointly providing power to the second solid state switch 140. Though only two solid state switches are illustrated, any number of parallel source switches or parallel destination switches (see FIG. 4) may be utilized without departing from the scope of the invention. In the illustrated embodiment, the current measured by current sensor 141 should equal the sum of the current through the first solid state switch 120 and the current through the third solid state switch 180. The current in the third solid state switch 180, sensed by current sensor 181, is provided to summer 185. If an additional parallel source were coupled to the third solid state switch 180, the current measured in the module would also be input to summer 185. As illustrated, no additional parallel source exists, so the signal provided to the output DP connection 188 by the summer 185 represents only the current measured by current sensor 181. The output DP connection 188 sends the "summed current measurement" from the third solid state switch to the parallel input 136 of the first module 120. The summer 125 of the first solid state switch 120 adds the measured current value received by the parallel input 136 with the current measured in the first module 120 by current sensor 121. A signal representing the value of this summation is then sent from output DP connection 128 to the input DP connection 146 of the second module 140 for comparison. In one embodiment, the functionality of the summer and comparator are integrated into a single device. If the difference between the current measured at the second module 140 and the summation of the parallel source switches 120, 180 is not within an allowable threshold, the comparator 143 will cause second trip out 150 to send a trip signal to open the switches of both the first solid state switch 120 and the third solid state switch 180.

Figure 4:
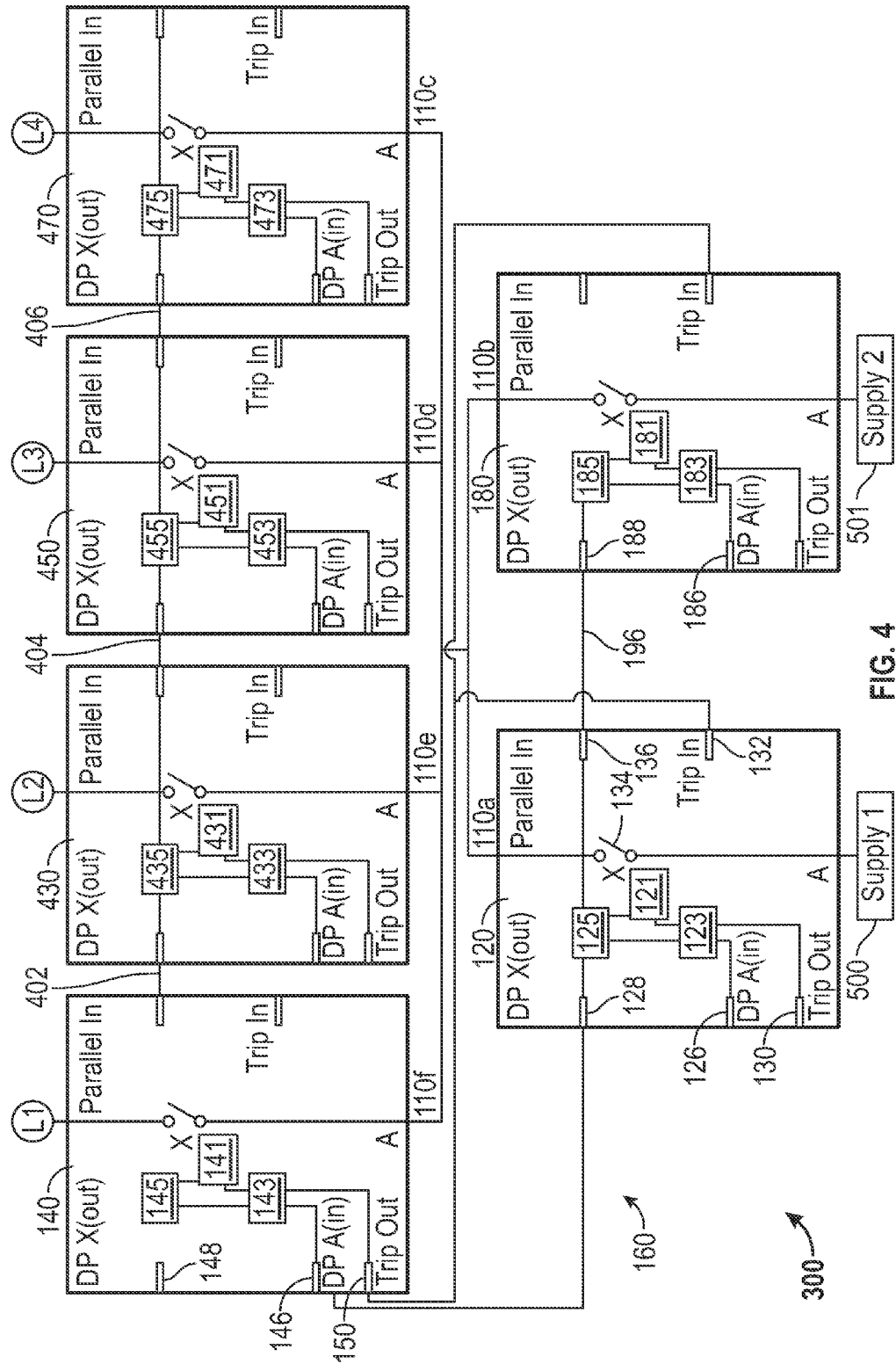
FIG. 4 is a schematic diagram of a portion of a power distribution network according to another embodiment of the invention.

An exemplary portion of an alternate power distribution network 300 is illustrated in FIG. 4. In the network 300, the first solid state switch module 120 and a third solid state switch module 180 are parallel source switches coupled to a plurality of parallel downstream solid state switches 140, 430, 450, 470 and each received power from respective power supply busses 500, 501. Each of the illustrated downstream solid state switches 140, 430, 450, 470 is connected to a load L1-L4 respectively. In one embodiment, the plurality of solid state switches within the network are identical and therefore, the illustrated solid state switches 120, 180, 140, 430, 450, 470 are interchangeable within the network 300. Similar to the system illustrated in FIG. 3, the first solid state switch 120 is connected to a first branch 110a of power transmission line 110, and the third solid state switch 180 is connected to a second branch 110b of power transmission line 110. At a position located between the source switches 120, 180 and the downstream switches 140, 430, 450, 470, the first branch 110a and the second branch 110b unite and the downstream branches 110c, 110d, 110e, 110f unite to form a single power transmission line 110. In the illustrated embodiment, the output DP connection 188 of the third solid state switch 180 is connected to a parallel input 136 of the first solid state switch 120 by wiring 196. Similarly, each of the parallel downstream solid state switches is connected to an input of an adjacent switch by wiring 402, 404, 406 respectively.

In the illustrated embodiment, the current measured by current sensor 181 in the third solid state switch 180 is summed by summer 185 with the current of an adjacent solid state switch. The "summed current measurement" from the third solid state switch 180 is sent to an input 136 of the first solid state switch 120. The summer 125 of the first solid state switch 120 adds the measured current value received by the parallel input 136 with the current measured by current sensor 121. With respect to the downstream solid state switches, a current sensor 471 measures the current in a solid state switch 470. The measured current value is then provided as an input to the adjacent solid state switch 450. A summer 455 adds the measured current value of the adjacent solid state switch 470 with the current measured by current sensor 451. The total current value of solid state switches 450 and 470 is transmitted to solid state switch 430 by wiring 404. Similarly, the current sensor 431 measures the current in the upstream solid state switch 430. The current measured by current sensor 431 is then added to the measured current value of solid state switches 450 and 470 by summer 435 and is provided as an input to the downstream solid state switch 140 across wiring 402. A summation is then taken of the current measured by current sensor 141 and the current of the solid state switches 430, 450 and 470 to get a total downstream current value. Because the downstream solid state switches are connected in parallel, the current values of each solid state switch are summed at the solid state switch connected to an output DP connection of an upstream solid state switch. Therefore, comparators 433, 453, and 473 do not perform any comparison in the illustrated example.

The summation of the upstream current in the upstream solid state switches is sent from output DP connection 128 to the input DP connection 146 of the second solid state switch 140 for comparison. If the difference between the downstream current and the total upstream current is not within an allowable threshold, the comparator 143 will cause trip out 150 to send a trip signal over circuitry 166 to open the switches of all of the upstream switches.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A solid state switch module for use in a power distribution network that includes a power transmission line comprising:
    an input differential protection connection for receiving a measured current value from one or more upstream solid state switch modules;
    an output differential protection connection for sending a measured current value;
    a trip outlet for sending a trip signal to the upstream module;
    a trip inlet, for receiving a trip signal from a downstream module, wherein the trip inlet is operably coupled to a switch;
    a current sensor for measuring a current value of the power transmission line across the solid state switch; and
    a comparator for determining whether an amount of current lost between the solid state switch module and an upstream module is within a specified level.

2. The solid state switch module according to claim 1, further comprising a summer for adding a current input from a parallel module with the current measured by the current sensor.

3. The solid state switch module according to claim 1, wherein the trip outlet is located adjacent the input differential protection connection.

4. The solid state switch module according to claim 3, wherein the comparator determines whether the difference in current is within the specified threshold.

5. The solid state switch module according to claim 1, wherein the comparator determines a difference between the current value from the current sensor and a second current value received from the upstream module.

6. The solid state switch module according to claim 1, wherein the specified threshold is generally less than or equal to 8%.

7. The solid state switch module according to claim 1, wherein if the comparator determines that the current lost between the solid state switch module and the upstream module is unacceptable, the trip outlet sends a trip signal to the upstream module.

8. The solid state switch module according to claim 1, wherein the upstream module may include a plurality of modules.

9. A system for providing differential protection in a power distribution network comprising:
    a power distribution line
    a first solid state switch module configured to provide differential protection, the first solid state switch module being electrically coupled to the power transmission line at a first location, wherein the first solid state switch module determines a first current in the power transmission line at the first location;

a second solid state switch module configured to provide differential protection, connected to the power transmission line at a second location, the second solid state switch module being substantially identical to the first solid state switch module and being arranged generally upstream from the first solid state switch module, wherein the second solid state switch module determines a second current of the power transmission line at the second location;

circuitry coupling the second solid state switch module and the first solid state switch module to transfer the second current to the first solid state switch module; and wherein the first solid state switch module determines an amount of current lost between the first solid state switch module and the second solid state switch module the first solid state switch module being configured to transmit a trip signal to the second solid state switch module in response to the difference being greater than a selected threshold, the trip signal causing the second solid state switch module to open and disrupt transmission of electricity there through.

10. The system according to claim 9, wherein the first solid state switch module includes a current sensor for measuring the current of the power transmission line at the first solid state switch module.

11. The system according to claim 9, wherein the first solid state switch module and the second solid state switch module are interchangeable within the power distribution network.

12. The system according to claim 9, further comprising:
at least one additional solid state switch modules connected in parallel with the second solid state switch module to provide differential protection, the at least one additional solid state switch module being substantially identical to the first and second solid state switch modules and being connected in parallel with either the first solid state switch module or the second solid state switch module.

13. The system according to claim 9, wherein the selected threshold is generally less than or equal to an 8% difference.

14. A method for identifying a loss in power within a power distribution network comprising:
measuring a current of a power transmission line at an upstream solid state switch module configured to provide differential protection;
measuring the current of a power transmission line at a downstream solid state switch module configured to provide differential protection, the downstream solid state switch module being substantially identical to the upstream solid state switch module;
comparing at the downstream solid state switch module the measured current of the downstream solid state switch module with the measured current of the upstream solid state switch module to determine a difference;
evaluating whether the difference is above a selected threshold; and
sending a trip signal from the downstream solid state switch module to the upstream solid state switch module if the difference is above the selected threshold.

15. The method according to claim 14, wherein the downstream solid state switch module includes a current sensor.

16. The method according to claim 15, wherein the upstream solid state switch module and the downstream solid state switch module are interchangeable within the power distribution network.

17. The method according to claim 15, wherein a comparator in the downstream solid state switch module compares the measured current of the downstream solid state switch module with the measured current of the upstream solid state switch module.

* * * * *